Nov. 11, 1930.  H. M. JACKLIN ET AL  1,781,013
METHOD AND APPARATUS FOR OBTAINING INDICATOR DIAGRAMS
Filed March 15, 1926    3 Sheets-Sheet 1

INVENTORS
Harold M. Jacklin.
Charles P. Roberts.
BY
ATTORNEY

Nov. 11, 1930.    H. M. JACKLIN ET AL    1,781,013
METHOD AND APPARATUS FOR OBTAINING INDICATOR DIAGRAMS
Filed March 15, 1926    3 Sheets-Sheet 2

INVENTOR.
Harold M. Jacklin.
Charles P. Roberts
BY
ATTORNEY

INVENTORS
Harold M. Jacklin.
Charles P. Roberts.

Patented Nov. 11, 1930

1,781,013

UNITED STATES PATENT OFFICE

HAROLD M. JACKLIN AND CHARLES P. ROBERTS, OF COLUMBUS, OHIO; SAID ROBERTS ASSIGNOR TO SAID JACKLIN

METHOD AND APPARATUS FOR OBTAINING INDICATOR DIAGRAMS

Application filed March 15, 1926. Serial No. 94,776.

Our invention relates to a method and apparatus for obtaining indicator diagrams and has to do particularly with the provision of a novel and accurate means for obtaining indicator diagrams from high speed, multi-cylinder internal combustion engines.

It has long been recognized in the art that indicator diagrams are only useful and efficient when the resulting record of the pressures within the cylinder directly indicates the various pressures or events in such cylinder in synchronism with the motion of the piston. In the past, various methods and means have been used and designed to accurately record the various pressures or events in the cylinder in synchronism with the motion of the piston, but the majority of the devices used have only been accurate when properly installed and used on engines designed to operate at comparatively low speeds as for instance, when used in combination with steam engines running at constant load. When these indicators have been used on internal combustion engines at low speeds and at constant loads, it has been necessary to obtain as many diagrams as possible during a test in order to obtain an approximate average. This has been necessary because of the great variations in operation from cycle to cycle even when operating conditions were ideal. Efforts to use these indicators on internal combustion engines at high speeds, where rather sudden changes in pressure occur, result in the obtaining of unsatisfactory diagrams due to the fact that, because of this speed and sudden changes in pressure, the inertia of the indicator piston, the springs, links, pencil, drum, and drum driving mechanism enter in as factors giving a very inaccurate record.

Attempts have been made to reduce the inertia of the parts of an indicator by arranging to deflect a beam of light on a ground glass or photographic negative by means of a mechanically and pressure operated mirror or mirrors which need move very little for a great deflection of the beam of light. Besides having the drawback of requiring photographic process to obtain a permanent record which may be distorted during these same processes, such devices have not been successful on engines whose speed approximates one thousand or higher revolutions per minute.

These efforts in the past to obtain indicator diagrams from high speed engines and particularly high speed automotive engines, have not only failed because of the great inertia of parts resulting from such high speed, but also for the reason that such diagrams have shown but one complete cycle. A diagram of but one complete cycle may or may not be an average diagram under the conditions of operation of the engine. A diagram representing a single cycle may be representative of approximate average conditions of a steam engine running at constant load, but a diagram of a single cycle of a high speed internal combustion engine, if the diagram could possibly be obtained, might not be representative of the average conditions which might exist in the cylinder, cycle to cycle.

Our aim is an entirely novel method of quickly and accurately obtaining an indicator diagram which, in itself, will correctly show the variations from cycle to cycle in any given cylinder of a high speed internal combustion engine over several cycles. This novel method of obtaining indicator diagrams showing the variations in conditions in high speed internal combustion engine cylinders, is accomplished by the provision of a simple and compact structure which may be connected to one or all of the cylinders of an internal combustion engine, and which is so constructed and operated as to be unaffected by any inertia effects in the indicator itself, and which is so constructed in combination with the operation of the engine, that the indicator diagram will be built up section by section so as to form a complete indicator diagram correctly showing the variation in conditions in the engine cylinder in exact synchronism with the movements of the piston in such cylinder.

One of the objects of our invention is the provision of an engine indicator for graphically describing by diagram the variations of pressure in the engine cylinder of a high speed engine, over a period of cycles.

Another object of our invention has to do with the provision of a novel device for insuring the indication of a particular event of pressure in the cylinder in exact synchronism with the movement of the piston in such cylinder. In other words, we have provided a device whereby, regardless of the time that pressure is admitted to the indicator, or regardless of the time that this pressure is marked on the diagram, such indication of pressure or event will be in synchronism with the position of the piston in the cylinder at the time of taking of such pressure or event.

A further object of our invention has to do with the provision of means for automatically admitting pressure to the indicator in proportionate synchronism with the revolutions per minute of the engine shaft and a differential structure for gradually changing the particular point in the engine cycle to be recorded upon the particular card. The result is that a graphic diagram is built up, section by section, each section being taken from a separate cycle and recorded in its correct sequence and position on the diagram and at a point corresponding exactly to the instantaneous position of the piston in the engine cylinder. The graphic diagram, thus built up, section by section, is a composite diagram of the conditions obtained in the cylinder being tested over several hundred cycles.

Another object of our invention contemplates the provision of means for admitting the effective pressure of the cylinder to the indicator structure for only a small instant of time, and means for moving the point in the cycle at which the valve is open and for gradually advancing the paper upon which the diagram is described. In this way, a small section of the final diagram is taken during each cycle of events in the engine cylinder and as the point in the cycle at which the pressure is admitted is varied, the paper on which the diagram is described is moved so that the new sections are recorded at points corresponding exactly to the simultaneous positions of the piston in the engine cylinder.

A further object of our invention contemplates the use of a cylinder for the reception of the engine cylinder gases and the partial filling of this cylinder with a liquid, preferably oil. In this case, the filling of the indicator cylinder with oil not only reduces the leakage past the indicator piston but also presents a means for reducing the clearance space in the indicator cylinder and thus requiring the transfer of an almost minute quantity of gases during the time the admission valve is open.

A further object of our invention has to do with the provision of novel cooling means for the gases being transferred from the engine cylinder to the indicator cylinder. By thus providing positive cooling means for the gases being transferred, it will be possible to indicate the variations in pressure in internal combustion engine cylinders without interference because of pre-ignition in the connecting tubes.

Many other features of our invention, such as various adjustments for adapting the indicator to various conditions and for rendering the indicator precise and accurate under all conditions, will be apparent as this description progresses and will be brought out in the claims appended hereto. The various objects of our invention are preferably obtained by the structures illustrated in the drawings wherein similar characters of reference designate corresponding parts and wherein—

Figure 1 is a perspective view, partly cut away and partly in section, of our novel indicating device and showing in detail the cam mechanism for admitting the gases to the indicator cylinder and the differential mechanism for controlling the relative position of the opening cam and driving shaft and for insuring positive synchronism between the movements of the indicator pencil and drum and the movement of the piston in the engine cylinder.

In describing the various parts of our invention, it will be well to recognize that the apparatus preferably used therein is separable broadly into an adjusting and synchronizing mechanism and an indicating mechanism. There are also certain minor combinations forming a part of either of said two main combinations, and particularly of said adjusting and synchronizing mechanism.

Figure 1:
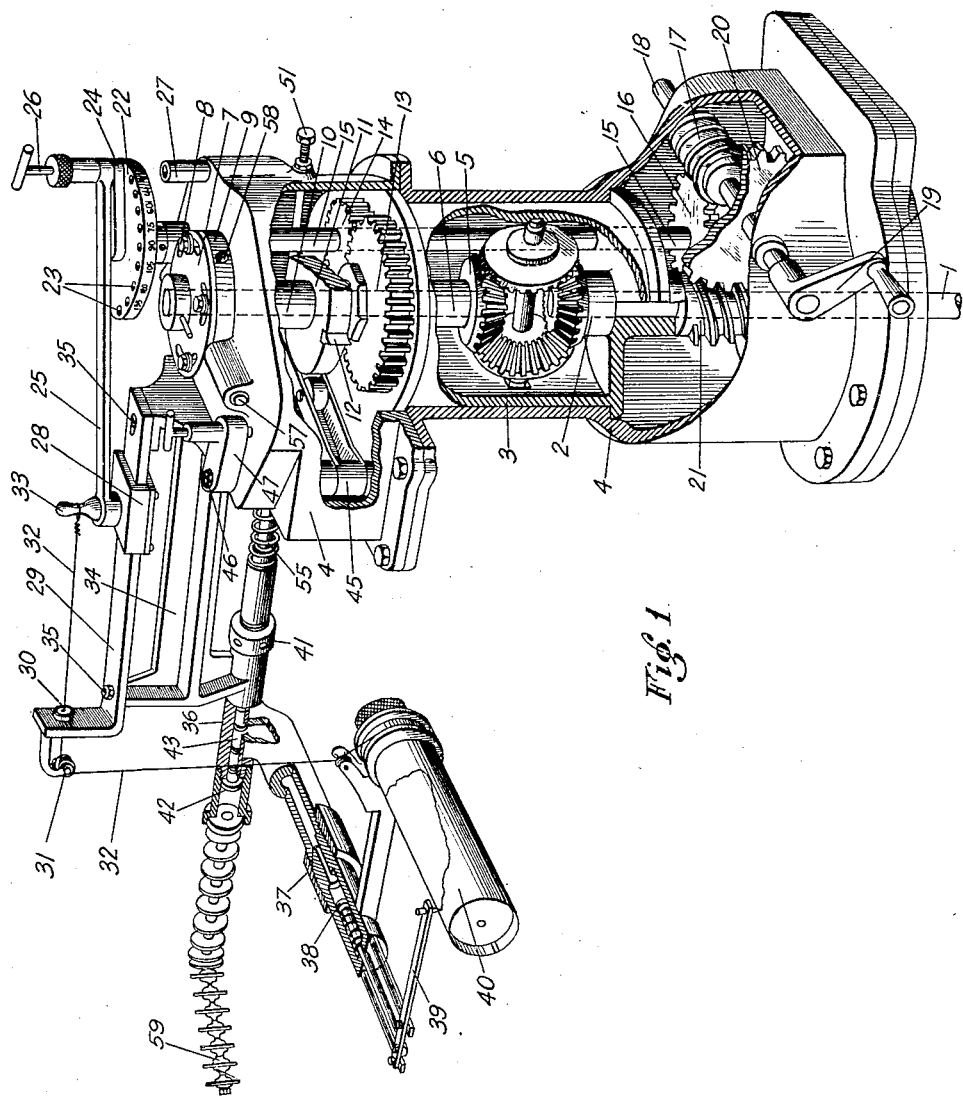

The main purpose of this adjusting and synchronizing mechanism is to accurately and precisely adjust and control the movements of the parts of the indicating device in exact synchronism with the movements and speed of the internal combustion engine but at a much lower speed so that all inertia effects are removed. In Figure 1, the adjusting and synchronizing device is shown as a single unit connected to the indicating device. This adjusting and synchronizing device is operated by a main driving shaft 1 which is designed to be driven by the particular engine to be tested through the medium of suitable gears or chain and sprockets or other means whereby the shaft 1 rotates continuously at a certain fixed relation to the speed of the engine. In the preferred operation of this device, this shaft 1 must be so geared to the engine crank shaft that such shaft 1 will rotate at one-half the speed of the engine crank shaft if such engine is operating on the four-stroke cycle. Shaft 1 should be operated at engine crank shaft speed when testing a two-stroke cycle engine, and when testing a six-stroke cycle engine if such were desired, the shaft 1 should rotate at one-third the crank shaft speed.

The main driving shaft 1 is directly connected to the driving gear 2 of a standard differential gear construction. These differential gears, as illustrated in Figure 1, are mounted in a differential gear case 3 which is adapted to be rotated within the main housing 4 of this adjusting and synchronizing device. The driven gear 5 of the differential gear construction is keyed to a shaft 6, shown in dotted lines in Figure 1, which shaft extends upwardly within the housing 4. Secured to the upper end of this shaft 6, by means of suitable keys or pins, is a slotted disc 7. Adjustably mounted on the under side of said disc 7, by means of screws 8, is a second disc or connecting collar 9 which is provided with a hollow extension 10.

Keyed to the hollow extension 10 of this adjustably supported disc 9 is a cam disc 11 provided with a cam element 12. This cam element 12 directly controls the opening of the valve for completing communication between the engine cylinder and the indicator cylinder as will be later described. It will be obvious that the cam disc 11 and cam 12 rotate in a direction opposite to the rotation of the main shaft 1 and at the same speed as the shaft 1 so long as the differential gear case 3 remains stationary.

This differential gear case 3 is provided at its upper end with a spur gear 13. The movement of this spur gear 13 and the differential housing 3 is controlled by pinion 14 which is secured to a shaft 15 carried by the main housing 4. Secured to the base of this shaft 15 is a worm wheel 16 designed to be driven by a suitable worm 17 mounted upon a shaft 18. The shaft 18 is provided with a crank 19. The shaft 18 is also provided with a suitable worm wheel 20 which is designed to mesh with a worm 21 keyed to the shaft 1 and which worm wheel 20 is ordinarily free to rotate on shaft 18. The shaft 18 is preferably provided with a jaw, or other standard type of clutch, as shown engaged in Figure 9 which is adapted to engage the worm wheel 20 when the shaft 18 is moved axially outward by means of the crank 19. Thus, by moving the shaft 18 axially outward, the clutch will engage with the worm wheel 20 and cause shaft 18 to be turned by the shaft 1 through the worm 21 and worm wheel 20. By moving this shaft 18 inwardly, the said clutch may be disengaged and the worm 17 moved manually by means of the crank 19.

The upper end of the shaft 15 is provided with a crank disc 22. Thus, it will be obvious that the crank disc 22 and the differential drive pinion 14 are both moved and directly controlled by the shaft 15. When testing a four-stroke cycle engine, the ratio between gears 13 and 14 should be 4 to 1; when testing a two-stroke cycle engine, the ratio should be 2 to 1, and on a six-stroke cycle engine, this ratio should be 6 to 1.

The crank disc 22 is preferably provided with a series of holes 23, preferably twenty-four in number, which are circumferentially arranged adjacent to the periphery of the disc. The twenty-four holes are provided so that the indicating device may be used on any multi-cylinder engine where the firing intervals are multiples of 15°. It will be understood that these holes 23 may be changed so that diagrams may be taken from multi-cylinder engines whose firing intervals are not in multiples of 15°, but in other multiples as may be desired.

The crank disc 22 is provided with a crank arm 24 to which is pivoted one end of a connecting rod 25. The crank arm 24 may be located in any desired position by means of a crank pin 26 which may be pushed down through the end of the connecting rod and the crank arm in registry with any one of the holes 23. It will be understood that the ratio between the length of the connecting rod and the throw of the crank arm 24 is made the same as the ratio between the length of the connecting rod and the throw of the crank used in the particular engine to be tested.

A boss or projection 27 provided with a locating hole in alignment with the holes 23 is located on the main housing 4, as shown in Figure 1, whereby a suitable locating pin, similar to pin 26, may be put through one of the holes 23 in the crank disc so that the crank 24 may be set on a dead center position with pin 26 in position in some chosen hole 23. Any suitable mechanism may be used for adjusting the ratio between the connecting rod 25 and the crank arm 24, as for instance, the connecting rod 25 itself may be adjustable in length, or different lengths of connecting rods may be used as replacement units.

The other end of the connecting rod 25 is pivotally connected to a crosshead 28 which is adapted to slide upon the crosshead guide 29. This crosshead guide is provided with an aperture guide 30 and a suitable pulley 31 for forming an intermediate support for an indicator cord 32 one end of which is preferably connected to a suitable projection 33 on the crosshead 28. The swivel or pulley 31 is preferably adjustable to permit the cord to be used with and correctly directed towards any type of standard slow speed indicator. The cross head guide 29 is adjustably mounted upon the frame 34 by means of slots and screws 35 whereby it is possible to arrange the center line of the crosshead guide in alignment with the center of the crank disc 22 and the hole 27 or to offset the same in the ratio of the throw of the crank arm 24 to the throw of the crank of the engine to be tested should the engine have offset cylinders. This is then done so that the crosshead 28 will simulate the exact motion of the piston in the engine cylinder. The frame 34 may be mounted upon the upper part of the housing 4 or may form an integral part thereof.

The frame 34 is also designed to receive and support a valve housing 36 to which may be attached any type of slow speed indicator. An indicator is shown connected to the valve housing 36 by means of a suitable union 37. This indicator is shown provided with the customary piston 38 which is designed to be actuated by the gases from the engine cylinder. A pencil arm 39 is connected to the piston 38 whereby the pencil point will be given a longitudinal motion along the axis of a paper supported by drum 40. Movement is imparted to the drum barrel 40 at right angles to the pencil motion by means of the cord 32 which may be connected thereto in a manner understood by those skilled in the art.

The housing 36 is secured to the frame 34 by means of a nut 41 and the indicator and housing may be set to any desired position for the taking of diagrams merely by loosening this nut 41 and adjusting the housing and indicator cord 32. This housing 36 is provided with a longitudinal opening for the reception of a valve 42 and a valve stem 43. It being understood that it is a part of our invention to partially fill the indicator cylinder with a supply of oil in order to reduce the clearance space in such indicator cylinder and thus reduce the quantity of gases to be introduced into such cylinder by the opening of the valve 42, it is apparent that this oil may be introduced by disconnecting the union 37, and that the valve housing 36 should be so set that the indicator cylinder points downward, thus retaining the oil above the indicator piston 38.

Figure 6:
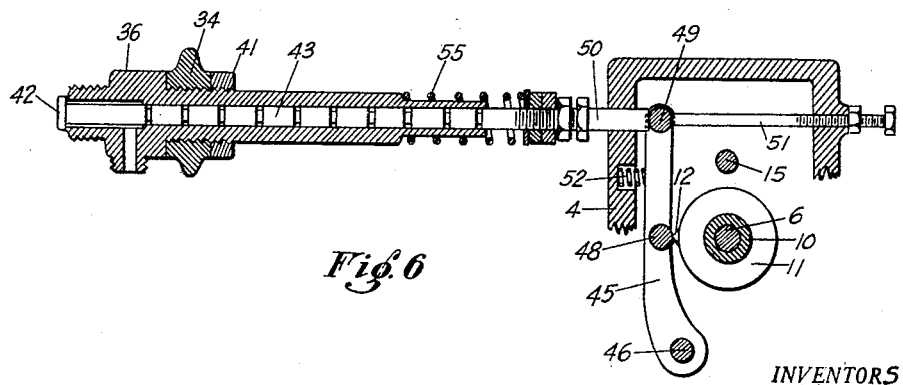
Figure 6 is a fragmentary sectional plan view taken through the valve operating mechanism showing the arrangement of the cam and cam follower for actuating the indicator valve.

As is shown in Figure 6, the cam element 12 is designed to strike the cam roller 48, carried by the cam follower 45 one end of which is pivoted on an eccentric shaft 46. This shaft 46 extends upwardly in the main housing 4 and is keyed at its upper end to a lever 47 Figure 1 which may be moved in an arc and locked in either one of two positions by means of a suitable pin similar to pin 26 as is clearly shown in Figure 1. At one position of the lever 47, the cam follower 45 will be resiliently held against the cam 12, while in the other position of the lever 47, the cam follower will be moved away from the cam 12 due to the eccentricity of the shaft 46. The cam follower 45 is provided with a small roller 48 against which the cam 12 contacts and at its other end the cam follower is provided with a second roller 49 which bears against an adjustable tappet 50 for actuating the valve 42 through the valve stem 43. The cam follower is moved towards the cam 12 and against an adjustable stop 51 by means of a suitable spring 52 carried by the housing 4. This adjustable stop 51 limits the return movement of the follower 45 and can obviously be adjusted so that the valve will close properly. It will also be obvious that if the valve tappet 50 is adjusted to be made longer or shorter, the valve 42 may be adjustably opened to different degrees of lift.

The valve stem 43 of the valve 42 is properly provided with oil grooves, passes through and is closely fitted into the valve housing 36 so that no packing is required to prevent leakage. The valve 42 is held in normal position by means of a coil spring 55 as shown in Figure 6.

Figure 2:
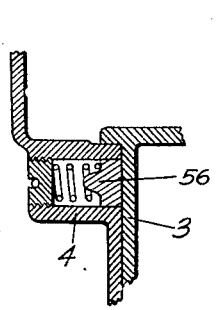
Figure 2 is a fragmentary detail view of the structure for frictionally engaging the differential housing to normally prevent turning movement thereof.
Figure 9:
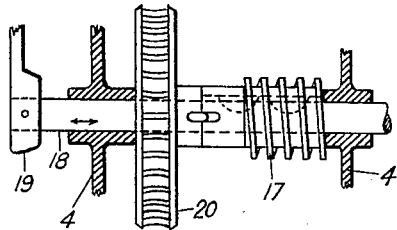
Figure 9 is a view showing the clutch mechanism whereby it is possible to change the point in the cycle at which the valve is opened and to operate the drum control mechanism either manually or mechanically.

As shown in Figure 2, the housing 4 is preferably provided with a spring pressed plunger 56 which is positioned within the housing and adapted to be resiliently forced against the wall of the differential housing 3. The purpose of this spring pressed plunger 56 is to prevent movement of the differential housing unless positively moved by means of handle 19 or worm and worm wheel 21 and 20 through the clutch, as shown in Figure 9.

For the purpose of timing the device, a second locating lug or hole 57 is provided on the housing 4 in addition to the lug 27. With the crosshead 29 properly lined up with the center of the crank disc 22 and hole 27, and with the length of the connecting rod 25 and crank 24 in proper ratio to the engine being tested, it is a very easy matter to time the device. The dead center of the engine having been ascertained and with the pin 26 in any chosen hole, the crank disc 22 is rotated so that a locating pin may be put through a hole in the crank disc opposite to the one chosen and into the hole 27. By removing the screws 8, the shaft 1 having been connected to the engine by any suitable means as heretofore described, and the engine placed on dead center, the disc 9 may then be rotated until the hole 58 registers with the hole 57, when the disc may be held by inserting a pin through hole 57 and into the hole 58. The cam 12 is then positioned so that it will hold the valve open on the dead center of the engine and of the crank 24. After the screws or nuts have been tightened, the locating or positioning pins must be removed. To any one at all experienced in the art, it is here apparent that all backlash or lost motion if any should be taken out of the mechanism and out of the drive to the engine in order to have the device correctly timed.

Figure 3:
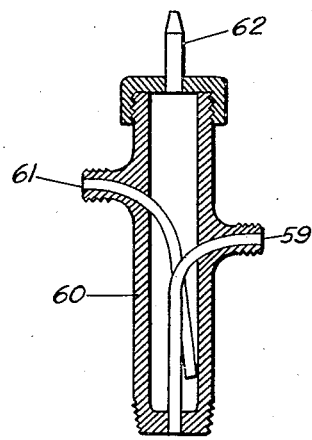
Figure 3 is a detail view of a preferred type of tube or plug for insertion into the engine cylinder to be tested, and showing one manner of cooling such plug to prevent overheating.

A tube 59, Figures 1 and 3, for conducting the gases from the engine cylinder to the valve housing 36 and thus to the indicator cylinder, is provided. This tube is preferably provided with a series of flanges or discs made of copper, aluminum, or similar material for cooling or it may be enclosed in a second tube through which water may be circulated to prevent overheating and ignition of the gases. This tube 59 may be connected to the cylinder itself by means of a suitable plug 60, Figure 3, threaded at its lower end for proper insertion in the cylinder. Water or other cooling means may be fed to and conducted away from the plug 60 by means of suitable conduits 61 and 62.

Figure 7:
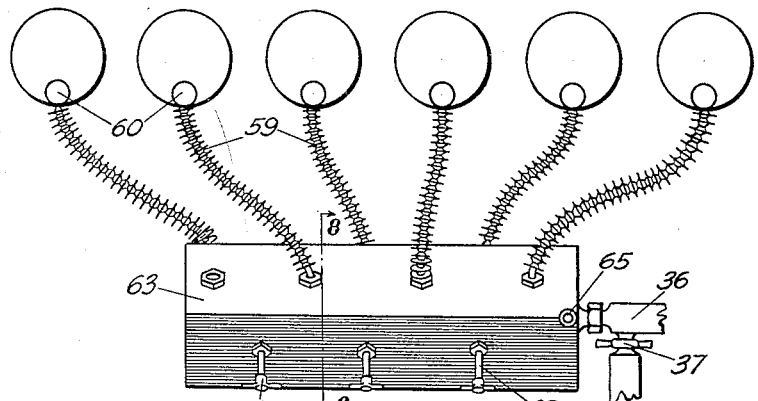
Figure 7 is a plan view of a manifold or valve box for connecting the indicator structure with the various cylinders of a multi-cylinder engine whereby it is possible to connect a selected cylinder to the indicator valve.
Figure 8:
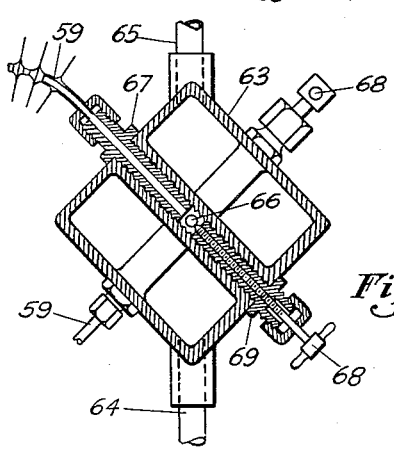
Figure 8 is a transverse section taken on line 8—8 of Figure 7 and showing the general arrangement of valve structure for admitting and transferring the gases from the engine cylinder and also showing the manner of cooling the manifold or valve box.

As shown in Figure 1, the device is arranged for use on a single cylinder engine. For obtaining indicator diagrams from a multi-cylinder engine, we have provided a manifold or valve box 63, as shown in Figures 7 and 8, for successively obtaining indicator diagrams from different cylinders of any engine without stopping the engine or removing the indicating device. This manifold or valve box 63, as shown, is approximately square in cross-section and cored to provide for cooling by water or other means, the cooling medium being conducted thereto and away from by means of conduits 64 and 65. The center of the manifold or valve box is preferably provided with a single conduit 66, one end of which may be connected with the valve housing 36 of the indicator device. As shown in Figure 8, the air cooled conduits 59 leading from the respective cylinders are connected to the manifold by means of suitable connection units 67. Valves 68 are provided for each conduit 59 and are positioned in the manifold by means of elements 69, similar to the elements 67. As will be clearly obvious in Figure 8, the valves 68 may be moved inwardly to shut off the passage of gases through any of the conduits 59 without restricting the passage of the gases from any other conduit to the valve housing 36. Thus, an indicator diagram can be taken from any one of a plurality of cylinders conveniently and quickly without stopping the engine or removing the indicating device and without danger of ignition from over-heated parts. The manifold 63 is preferably provided with an extra valve 68, as shown in Figure 7, for the admission of atmospheric air to the indicating mechanism for obtaining the atmospheric line on the indicator diagram.

In Figure 7, the manifold is shown for connecting a set of six cylinders to the indicating device. It will be obvious from the above description, that if this were a six cylinder, four-stroke cycle engine, with the crank pin 26 located in a correct hole 23 in the crank disc 22 for obtaining a diagram from say, cylinder No. 5, that, in order to obtain a diagram from cylinder No. 2, it would only be necessary to close the manifold valve for No. 5 cylinder and open the corresponding valve for No. 2 cylinder since the crank pins of cylinders 2 and 5 are always in the same plane in a conventional six cylinder, four-stroke cycle engine. Then, to obtain diagrams from cylinders 1 and 6, it becomes necessary to manipulate the proper valves 68, but with the crank 24 moved around 120° on crank disc 22 and with pin 26 placed in the proper hole 23. After obtaining diagrams from cylinders 1 and 6, it is then necessary to again move the crank 24 to a new position 120° from the other two positions on crank disc 22 and to manipulate the proper valves 68. In any other multiple cylinder engine, it is necessary to have a sufficient number of valves 68, and to move the crank 24 to positions on the crank disc 22 corresponding to the selected crank pins of the engine being tested.

Figure 4:
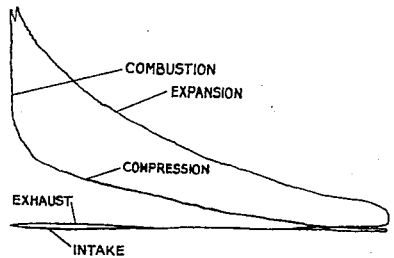
Figure 4 illustrates a conventional diagram taken from the cylinder of a high speed internal combustion engine and such diagram showing the variation in conditions in such cylinder.
Figure 5:
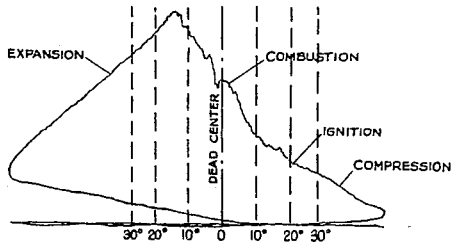
Figure 5 illustrates a 90° diagram taken from the same cylinder operating under the same conditions as the diagram in Figure 4. This diagram was taken by shifting the crank for controlling the movement of the indicator drum to a point 90° from the point used in making the diagram in Figure 4 in order to obtain a diagram which shows the combustion line more in detail.
Figure 10:
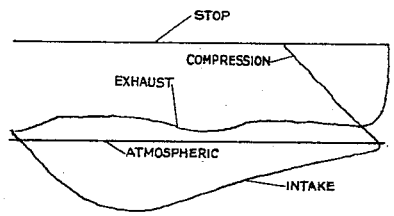
Figure 10 is a so-called lower loop diagram obtained from a four-stroke cycle engine when using a very light spring and a stop for the protection of the spring in a conventional slow speed indicator in combination with our device. It is an enlarged picture of the lower part of Figure 4 wherein it is possible to see the variations in pressure during the exhaust and intake strokes more in detail.

In the operation of our device, an indicator card is placed upon the drum 40 of the indicating mechanism and the valve for admitting the gases from the cylinder to be tested is opened to admit such gases through a proper conduit 59, it being understood that the ratio between the connecting rod 25 and crank 24 is the same as the ratio between the connecting rod and crank of the engine and that the cam 12 and discs 22, 7 and 9 have been positioned for correct timing as above described. If the diagram is to be taken by hand, the shaft 1 is connected to the shaft of the engine to be tested by any suitable means to rotate in the proper ratio. The pencil lever 39 may then be pressed against the paper on the drum 40. If the handle 19 of the differential housing 3 is not moved, the cam 12 will open the valve 42 at exactly the same point in each cycle. However, if the shaft 1 is rotated at one-half engine speed, for instance, for testing the four-stroke cycle engine, and the crank disc 22 is rotated by moving the handle 19, the cam 12 will be gradually moved ahead or backward, as the case may be, thus striking its follower and opening the valve 42 at the different points in the successive cycles. As the movement of the handle 19 directly controls the movement of the disc 22 in synchronism with the advancement or retarding of the cam 12, the paper on the drum 40 will be moved accordingly. When the handle 19 is moved so that the disc 22 has passed through two complete turns, the cam 12 will be in exactly the same position with reference to the shaft 1, and it will have been advanced or retarded one full turn in the process. Furthermore, while the crank disc has been making two complete turns, the crosshead 28 has moved twice in each direction, thus completing four complete strokes. As the drum is actuated by the cross head in one direction, and by its return spring in the opposite direction, such drum will have been moved twice in each direction. Since the valve is opened by the cam 12 for only a short period during each cycle, and since the cam 12 makes one complete advancement or retardation while the crank disc has made two complete turns, the pencil on the drum 40 will rise and drop according to the pressure in the engine cylinder at the time the valve is open, which time coincides with the time at which the crank pin of the engine corresponds exactly with the position of the pin 26. Furthermore, as the position of the crosshead 28 is controlled by the position and the throw of the crank pin 26 and the connecting rod 25, the ratio of the connecting rod and the throw being exactly the same as that between corresponding parts in the engine, the drum 40 will be moved so that the pencil bears on points corresponding to the simultaneous position of the engine piston. In other words, by these steps of operation, a complete diagram, as shown in Figures 4, 5 and 10, is built up and traced on the card, section by section, as the handle 19 is moved, each part being exactly in its proper position and in exact synchronism with the engine crank and piston. As the valve opens only once in each cycle, and for a very small period of that cycle, these successive parts of the diagram are taken over some period of time (say one minute) and such built up diagram, therefore, shows the variation in conditions existing in the cylinder during that time.

If it is desired to move the disc 22 and advance the drum 40 gradually and automatically to build up the diagram, it is only necessary to pull out the handle 19 to move the shaft 18 axially, whereby the worm wheel 20 will be engaged by a clutch as shown in Figure 9 and thus move the shaft 15 in a certain relation to the speed of the shaft and at a much lower speed than that of the engine. This process, of course, gives diagrams that are more uniform than can possibly be obtained when operating the mechanism manually, except by very careful and experienced operators.

Figure 4 illustrates a diagram actually taken by means of this indicating device, the various sections of the diagram being built up section by section to show the variation in conditions over a number of cycles.

Figure 5 is a diagram taken under similar operating conditions with the crank pin 26 shifted to a hole 23, 90° from the hole 23, used in taking the diagram in Figure 4.

Figure 10, is a "lower loop" diagram obtained by using a light spring 38 in the indicator with a suitable stop arranged to protect the pencil motion and the light spring. Such a diagram shows clearly whether or not the exhaust and inlet valves are of proper size and whether or not they are properly operated. While this lower loop is apparent in Figure 4, it is here shown in Figure 10 to a larger scale, thus bringing out the smaller variations so that they may be studied to the end that valve timing and size of parts may be improved; or the manifold may be improved in size or shape. To one experienced in the art, it will be apparent that this device will enable studies to be made that have, heretofore, been impossible.

It will be understood that the diagrams may be taken at various periods of time in accordance with the speed of rotation of the crank 19. It will also be understood that if the crank is moved fast enough, the indicator diagram will, upon close inspection, show a series of steps, the short horizontal movements indicating the movement of the drum to arrive at a new point in the cycle, while the vertical movement will indicate the increase or decrease in pressure in the engine cylinder at that point.

An important aspect of this invention consists in the fact that a simple and effective means is provided for synchronizing the admission of pressure from any cylinder of an engine for the operation of one of the elements of the recording means with the operation of the other element of the recording means. This is coupled with the provision of a means for driving the second element of the recording means in exact synchronism with the movements of the engine piston and crank shaft.

In order to accomplish these results, we have provided a means for operating one element of the recording means which is preferably in the form of a crank disk and pitman. The crank disk and the pitman in turn operate a cross-head which is used to operate a cord for actuating the drum of the recording means. The pitman and the crank of our recording means naturally has the same motion as the piston rod and crank of the engine. Furthermore, this pitman and crank are definitely proportioned with relation to the piston and crank of the engine to have the same ratio of movement thereto.

Our structure is such that the pitman and crank of the recording mechanism may be adjusted to dead center position. When they are in this dead center position, owing to their connection with the crank shaft of the engine, the crank shaft of the engine and the piston and piston rod of the engine are also in dead center position. The pitman and crank are so placed that it may be visually determined when they are in dead center position.

The pencil of the recording means is operated by a piston which is in turn intermittently operated by pressure from a cylinder. It is important to have the operation of the pencil properly synchronized with the operation of the drum. Therefore, inasmuch as the piston and the crank are initially set at dead center position, it is desirable to have the valve which is intermittently opened to admit the pressure to the pencil operating piston arranged in such relation to the operating means for such valve that the valve will open at the time the piston rod and crank therefor is in dead center position. For this reason, the cam which operates the said valve is adjustably connected to the driving shaft of the engine. This is accomplished by the use of one disk which is directly connected to the driving shaft of the engine and which is superimposed upon a second disk which is connected directly to the cam. These two disks are rotatably adjustable with relation to each other.

After the pitman and crank disk are in dead center position, the driven disk which is directly connected to the cam is adjusted so that the cam will open the valve at the dead center position of the engine. A means has been provided for properly fixing the position of this driven disk so as to ensure that this coincidence of position between the pitman and the crank disk and the cam and the valve which it opens may be readily obtained. This means takes the form of pin holes in the driven disk and a pin supporting lug 57.

It will be seen, with this structure, it is readily possible to definitely position the pitman and crank with relation to the engine piston rod and crank and, at the same time, to definitely position the cam with relation to such engine piston rod and crank. When these definite positions are initially obtained, it will be apparent that all backlash or lost motion, if any, should be taken out of the mechanism and out of the drive to the engine in order to have the device correctly timed. If this is done, correct timing will result.

In changing over from one cylinder to another cylinder, it is necessary that the pitman and the crank disk be so adjusted that they will be in dead center position at the same time that the piston rod and crank of the new cylinder are in dead center position. It is also necessary that the cam be adjusted to open at dead center position. The pitman and crank disk are adjusted by connecting one end of the pitman to another hole in the crank disk. The cam is then adjusted as previously described.

It will be understood that the discussion so far has dealt with cylinders which are in normal position of horizontal alignment. Where the cylinders are offset, it is necessary to use an offset adjustment. This is effected by turning the slide 29 about the pivot 35 and then securing it in proper position.

When the device is in operation, the openings of the valve may be progressively changed so as to occur at successively earlier or successively later points in the successive cycles of the piston in any given cylinder. This operation is performed by the hand crank 19 which rotates the differential housing in either direction desired.

The movement of this differential housing may, however, be effected to progressively change the instant of opening of the valve so as to cause it to occur at successively later points in successive cycles by automatically operated mechanism. This mechanism is the worm gear 20 and the worm gear 21, rendered effective by the proper operation of the clutch on the shaft 18.

Having thus described our invention, what we claim is:

1. A device for indicating the pressure in engine cylinders comprising a means operable by the pressure from a cylinder for controlling one element of a recording means, a pitman and crank mechanism for operating the other element of such recording means, the pitman and crank of said mechanism being of the same proportion as the connecting rod and the crank of the engine being tested, said mechanism being driven from the engine by means of speed reduction gearing.

2. A device for indicating the pressure in engine cylinders comprising a means operable by the pressure from a cylinder for controlling one element of a recording means, a pitman and crank mechanism for operating the other element of such recording means, the pitman and crank of said mechanism being of the same proportion as the connecting rod and the crank of the engine being tested, said mechanism being driven from the engine.

3. A device for indicating the pressure in engine cylinders comprising a means operable by the pressure from the cylinder for controlling one element of a recording means, a pitman and crank mechanism driven by the engine for operating the other element of said recording means, means for operating said means and said mechanism in timed relation to each other, means for varying cycle periods which are being measured, and means for reducing the speed of operation of said mechanism with relation to the engine speed.

4. In a device for indicating the pressure in engine cylinders comprising a means operable by the pressure from a cylinder for controlling one element of the recording means, and mechanism driven by the engine for operating the other element of such recording means, mechanism for aligning the parts to insure accurate relation before starting, comprising relatively adjustable drive and driven disks and setting pins.

5. A device for indicating the pressure in engine cylinders comprising a means operable by the pressure from a cylinder for controlling one element of a recording means, a pitman and crank mechanism driven by the engine for operating the other element of such recording means, means for operating said means and said mechanism in timed relation to each other, and means for automatically varying the cycle periods which are being measured.

6. A device for indicating the pressure in engine cylinders comprising a pitman and crank operable from the engine at a reduced speed, a crosshead operable by said pitman, a slide for said crosshead, and means for aligning said slide, crosshead, pitman and crank.

7. In a device for recording the pressure in a plurality of cylinders, comprising a recording means, a means for utilizing the pressure from a cylinder for operating one element of the recording means, a cam element operable to periodically actuate said last named means, and means for adjusting said cam element comprising a drive and a driven element relatively movable with respect to each other, and means for securing said drive and driven elements together in their adjusted position.

8. A device for recording the pressure in an engine cylinder comprising a piston actuable by pressure from the cylinder for moving one element of a recording mechanism, a cylinder in which said piston is mounted, and a non-compressible fluid interposed between said piston and said pressure from the engine cylinder whereby said piston is actuated through said non-compressible fluid by a minimum amount of pressure gases.

9. A device for recording the pressure events in a plurality of engine cylinders comprising a recording mechanism and means for adjusting said recording mechanism from a position wherein it operated to record the pressure events in one cylinder in synchronism with the movement of the piston in that cylinder from a predetermined position to a position wherein it will operate to record the pressure events in another cylinder in synchronism with the movement of the piston in that cylinder from a predetermined position without stopping the engine.

10. A device for recording the pressure events in a plurality of engine cylinders comprising a recording mechanism and means for adjusting said recording mechanism from a position wherein it operated to record the pressure events in one cylinder in synchronism with the movement of the piston in that cylinder from a predetermined position to a position wherein it will operate to record the pressure events in another cylinder in synchronism with the movement of the piston in that cylinder from a predetermined position without stopping the engine, said recording means being operative over a succession of cycles, and means for adjusting said recording mechanism to effect recording of different parts of successive cycles.

11. A device for indicating the pressure in engine cylinders comprising a means actuable by the pressure from an engine cylinder for operating one element of a recording means and mechanism driven by the engine for operating the other element of a recording means, said mechanism embodying a connecting rod and crank, the ratio between the length of a connecting rod and the throw of the crank being the same as the ratio between the length of the connecting rod and the throw of the crank of the particular engine to which the indicating device is attached.

12. A device for indicating the pressure in engine cylinders comprising a means actuable by the pressure from an engine cylinder for operating one element of a recording means, mechanism driven by the engine for operating the other element of a recording means, said mechanism embodying a connecting rod and crank, the ratio between the length of a connecting rod and the throw of the crank being the same as the ratio between the length of the connecting rod and the throw of the crank of the particular engine to which the indicating device is attached, and means for adjusting the engine driven mechanism so that it will operate in synchronism with the movement of the pistons in such cylinders.

13. In a device for recording the pressure in an engine cylinder, a recording mechanism, means actuable by the pressure from a cylinder for operating one element of said recording mechanism, means for periodically admitting pressure from an engine cylinder to said cylinder pressure actuated means, and means for adjusting said pressure admitting means to vary the point of admission of cylinder pressure, said last named means comprising a drive and a driven element relatively movable with respect to each other and means for securing said drive and driven element together in their adjusted position.

14. In a device for recording the pressure in an engine cylinder having cooperating recording elements, a means for operating one of such recording elements at a selected instant by pressure from the cylinder, said means comprising a valve controlled passageway from the cylinder, a means for operating the other element of the recording means comprising a pitman and crank structure driven by the engine, means for opening the valve at a predetermined instant in the cycle, means for adjusting to synchronize the pitman and crank structure with the piston and crank of the engine cylinder, and means for adjusting said valve opening means to synchronize the opening of the valve with the movements of the piston and the pitman.

15. In a device for recording the pressure in an engine cylinder having cooperative recording elements, means for actuating one of said recording elements at a predetermined instant by pressure from the engine cylinder, means for operating the other of said recording elements by the movement of the piston operating in said cylinder, said first means comprising a cam operated valve and said second means comprising a crank and pitman structure, and means for positioning said cam and said pitman structure so that the valve is open and the pitman structure is on dead center with the engine piston at the same time.

16. In a device for recording the pressure in an engine cylinder having cooperative recording elements, means for actuating one of said recording elements at a predetermined instant by pressure from the engine cylinder, means for operating the other of said recording elements by movement of the piston operating in said cylinder, and gauging means for starting said last two means in predetermined positions with relation to each other and to the position of the piston in said cylinder.

17. In a device for recording the pressure in an engine cylinder having cooperative recording elements, means including a valve and operating means therefor for actuating one of said recording elements at a predetermined instant by pressure from the engine cylinder, a pitman and crank structure for operating the other of said recording elements by the movement of the piston operating in said cylinder, a means for gauging the starting position of said first means to determine the open position of the said valve, and a means for gauging the starting position of said pitman and crank structure, said last two means being effective to ensure that the said valve will be in open position when the pitman and crank structure and the piston are in dead center positions.

18. A device for indicating the pressure in engine cylinders comprising a means operable by the pressure from a cylinder for controlling one element of a recording means, a pitman and crank disk for operating the other element of such recording means, a cross-head operable by said pitman, a slide for said cross-head, and means for securing one end of said pitman to said crank disk in various positions so as to synchronize the pitman and crank structure with the piston and crank of the engine cylinder.

19. A device for indicating the pressure in engine cylinders comprising a means operable by the pressure from a cylinder for controlling one element of a recording means, a pitman and crank for operating the other element of such recording means, a cross-head connected to one end of said pitman, a guide for said cross-head, said pitman, crank and cross-head being adjustable to permit alignment thereof to synchronize their relative positions with the position of the engine piston, connecting rod and crank in the particular cylinder whose pressure is to be indicated.

In testimony whereof we hereby affix our signatures.

HAROLD M. JACKLIN.
CHARLES P. ROBERTS.